United States Patent [19]

Hague

[11] 4,229,131
[45] Oct. 21, 1980

[54] TIEDOWN WINCH

[75] Inventor: Richard E. Hague, Franklin, Mich.

[73] Assignee: MacLean-Fogg Company, Mundelein, Ill.

[21] Appl. No.: 760,870

[22] Filed: Jan. 21, 1977

[51] Int. Cl.³ .......................... B60P 3/06; B60P 7/08; B61D 45/00

[52] U.S. Cl. ..................................... 410/12; 248/503; 254/223; 410/103

[58] Field of Search .................. 105/368 T, 477, 482, 105/55.1, 55.3; 206/335; 220/1.5; 248/119 R, 499, 500, 503; 254/161, 164; 280/179 A; 410/12, 103

[56] References Cited

U.S. PATENT DOCUMENTS

| | | | |
|---|---|---|---|
| 3,650,222 | 3/1972 | Broling et al. | 105/368 T |
| 3,673,969 | 7/1972 | Peisner et al. | 105/482 |
| 3,841,235 | 10/1974 | Wheeler et al. | 280/179 A |
| 4,044,691 | 8/1977 | Kilgus et al. | 105/368 T |
| 4,143,600 | 3/1979 | Hlinsky | 410/7 |
| 4,168,668 | 9/1979 | Grube et al. | 254/161 X |

*Primary Examiner*—John J. Love
*Assistant Examiner*—Howard Beltran
*Attorney, Agent, or Firm*—Mason, Kolehmainen, Rathburn & Wyss

[57] ABSTRACT

A tiedown winch for securing a load such as an automobile to a transporting vehicle such as a railroad car includes a housing slidable in a track carried by the transporting vehicle. A chain for securing the load is wound on a drum journalled in the top and bottom walls of the housing for rotation around a vertical axis. The housing includes end walls, each of which is provided with an opening so that the chain can extend from the housing in either direction. The openings are arranged tangentially with respect to the drum and are located on opposite sides of the longitudinal axis of the housing so that rotation of the drum in a single direction can wind the chain along a direct path through either opening. A locking bolt substantially shorter than the width of the housing is carried by one end wall to engage the track for retaining the winch at a selected position along the track.

8 Claims, 5 Drawing Figures

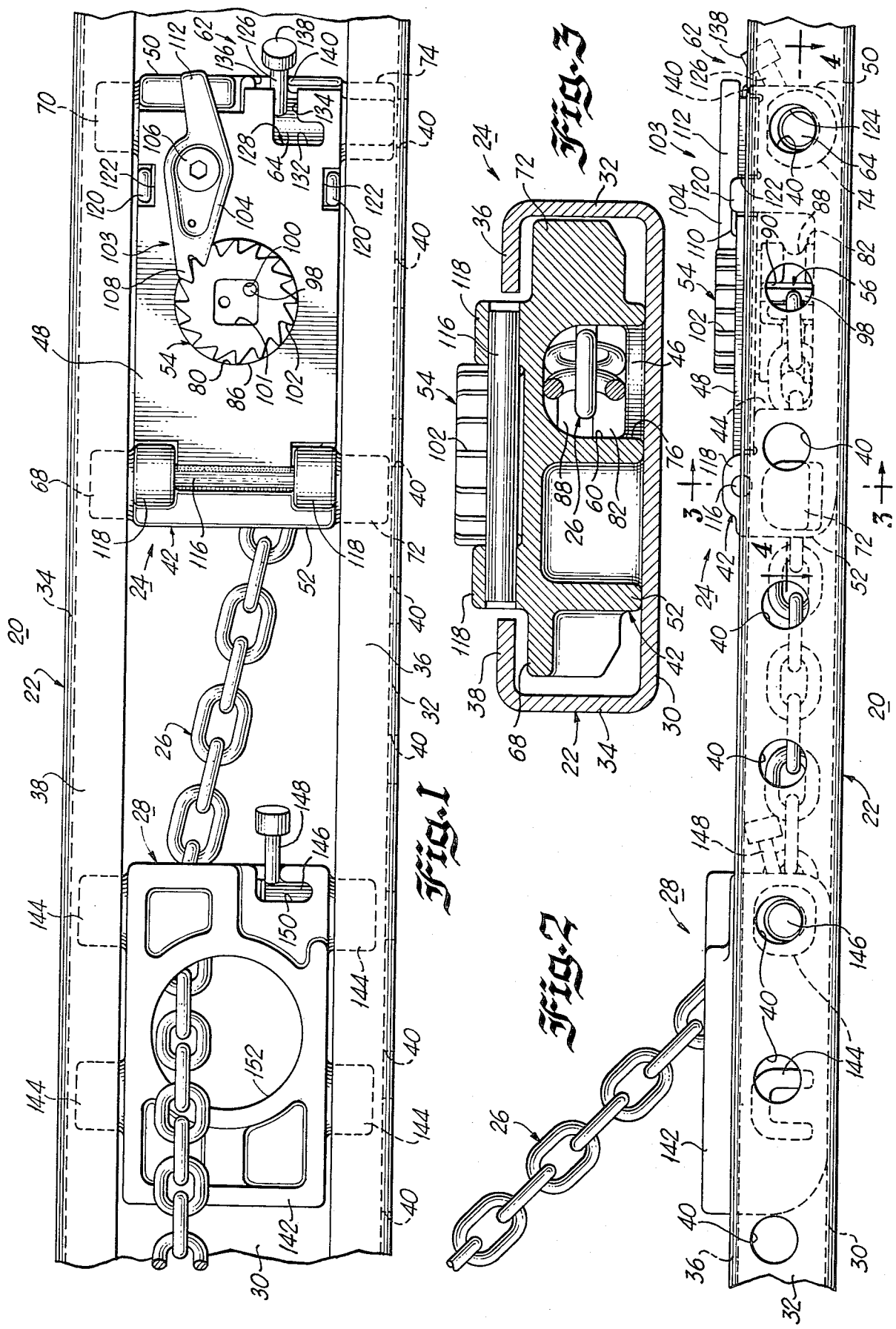

TIEDOWN WINCH

The present invention relates to a cargo tiedown device, and more particularly to a tiedown winch for securing loads such as automobiles to a transporting vehicle such as a railroad car.

For the transportation of automotive vehicles by rail, a vehicle is placed on the deck of a railroad car and then secured in position so that it will not be dislodged by vibrations and shocks during travel of the railroad car. A flexible tiedown member, typically a chain, is used to secure the vehicle. Normally the chain extends from an attachment point on the frame of the vehicle, and a tiedown winch carried by the deck of the car is used for holding the chain in a taut condition.

Since a transporting vehicle such as a railroad car should be able to accommodate vehicles or other loads of various sizes and shapes, it is desirable that the tiedown winch be movable along the car deck. An accepted solution to this problem is to provide one or more tracks in the deck along which one or more tiedown winches are slidably mounted. A locking mechanism such as a locking bolt engageable with openings in the track is used to secure the winch in a desired position.

A load securement system including a tiedown winch should be as compact and as low in profile as possible so as to create minimum obstruction of the car deck. Tiedown winches used in the past have typically included a chain takeup drum rotatable about a horizontal axis. One difficulty with tiedown winches of this construction is that when the tiedown chain is wrapped upon the drum, the overall height of the winch is undesirably large.

It has been proposed in order to overcome the problem of excess height to provide a tiedown winch having a drum rotatable about a vertical axis. However, in order to conveniently secure loads to a transporting vehicle, it is desirable that the tiedown chain be capable of extending in either longitudinal direction from the winch. It is moreover desirable that the drum be rotatable in a single direction in order to tighten the chain from either direction. Tiedown winches known in the past have not been effective in satisfactorily meeting these goals.

An important object of the present invention is to provide improvements in tiedown winches, and more specifically to provide improvements in tiedown winches having a takeup drum rotatable about a vertical axis. Other important objects of the present invention are to provide a tiedown winch wherein the chain may extend in either direction from the drum, and to provide a tiedown winch which is convenient to use and is adaptable to many applications.

In brief, in accordance with the present invention, there is provided a tiedown winch including a housing slidable in a supporting track and having a chamber defined between top and bottom walls and spaced end walls. A takeup drum is journalled in the top and bottom walls for rotation around a vertical axis.

In accordance with a feature of the present invention, each end wall of the housing is provided with a chain opening so that the chain can extend from the drum in either direction for attachment to a load to be secured. Each chain opening is tangentially located with respect to the drum periphery and the chain can take a direct path from the drum through the winch housing. The chain openings are tangent to diametrically opposite sides of the drum so that rotation of the drum in a single direction is capable of tightening the chain from either direction. A locking bolt substantially shorter than the width of the housing is carried by one of the end walls and provides space for the chain opening associated with that end wall.

The present invention together with the above and other objects and advantages will appear from the following detailed description of the embodiment of the invention illustrated in the accompanying drawings, wherein:

FIG. 1 is a top plan view of a load securement system including a tiedown winch constructed in accordance with the present invention;

FIG. 2 is a side elevational view of the structure shown in FIG. 1;

FIG. 3 is a sectional view taken along the line 3—3 of FIG. 2 and illustrating portions of the tiedown winch and track;

Figure 4:
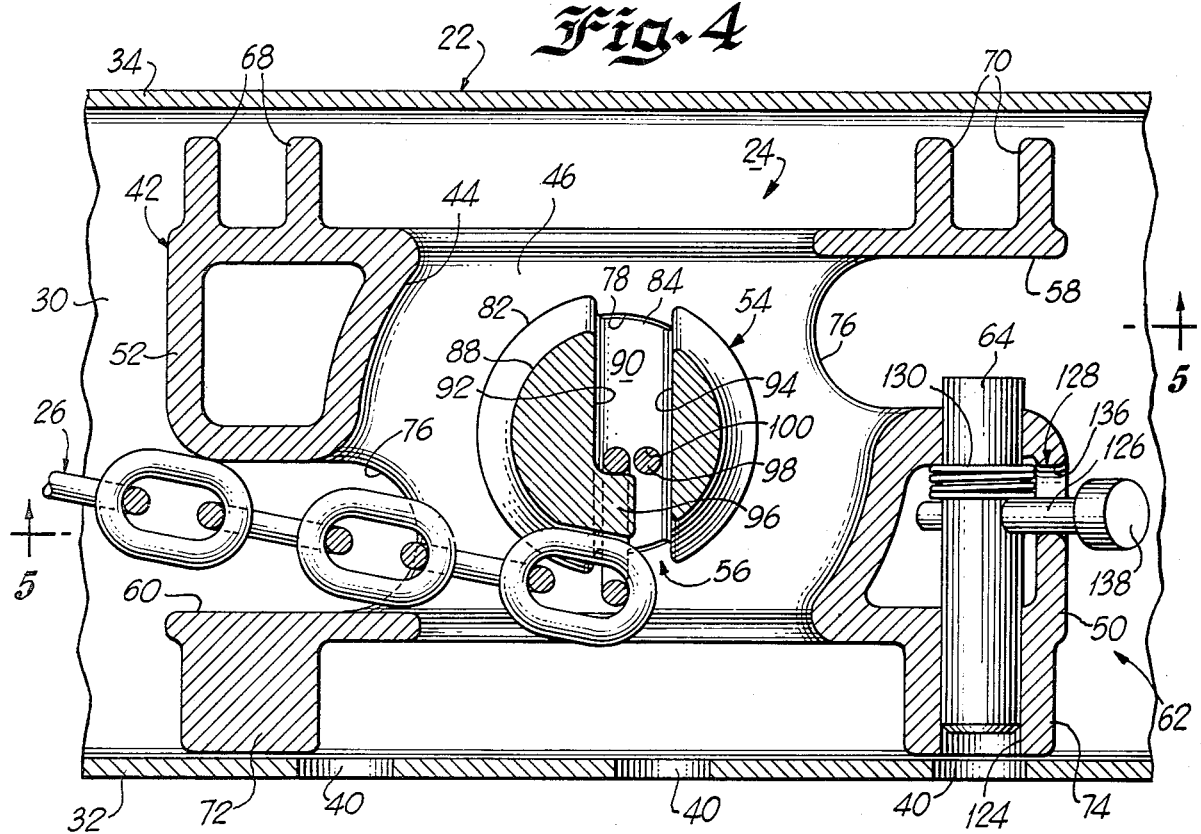
FIG. 4 is a sectional view taken along the line 4—4 of FIG. 2.

Having reference now to the drawings and initially to FIGS. 1 and 2, there is illustrated a load securement system generally designated as 20 of a type useful for securing loads such as automobiles or other vehicles to a transporting vehicle such as a railroad car. The system 20 includes a track 22 slidably supporting a tiedown winch embodying the features of the present invention and generally designated as 24.

Certain features of the tiedown winch 24 are the subject of a copending application Ser. No. 760,928 now U.S. Pat. No. 4,168,668, issued Sept. 25, 1979, of William L. Grube and Allen D. Siblik filed on the same day as the present application. Said copending Grube et al application includes a detailed description of structures and features of the winch 24 beyond that necessary for a complete understanding of the present invention. Reference may be had to that copending application for a further description, incorporated by reference herein, of the construction of the tiedown winch 24.

In a typical load securement arrangement in which the system 20 may be used, the track 22 is mounted within or upon a deck (not shown) of a railroad car. A chain 26 is attached to a load such as an automotive vehicle, and the chain is secured and tightened by the tiedown winch 24. In the illustrated arrangement, the system includes an idler device 28 through which the chain 26 extends between the winch 24 and the load. It should be understood, however, that the use of an idler device is not necessary, and that the chain 26 may extend outwardly and upwardly to the load directly from the tiedown winch 24.

The track portion of the load securement system 20 may take many forms. Normally, spaced apart and opposed track portions are provided between which and within which the tiedown winch 24 is slidably mounted. The track 22 is in the form of a channel and provides a convenient way of achieving this end. Track 22 in the illustrated arrangement includes a base wall 30 capable of being attached as by fasteners (not shown) to a railroad car deck. A pair of side walls 32 and 34 extend upwardly along the sides of the base 30, and a pair of inwardly extending flanges 36 and 38 capture the tiedown winch 24 within the channel track 22. In order to permit locking of the tiedown winch at selected positions along the track, a series of locking openings 40 are provided in the side wall 32 between the base 30 and the flange 36.

In general, the tiedown winch 24 of the present invention includes a housing or body generally designated as 42 having a central chamber or cavity 44 defined between a bottom wall 46 and a top wall or cover 48 and between a pair of end wall structures 50 and 52. Within the chamber 44, a winch or takeup drum 54 is mounted for rotation around a vertical axis. Chain 26 is releasably attached to the drum 54 by means of a chain attachment structure generally designated as 56. The chain attachment structure 56 is the subject of a copending application Ser. No. 760,869 now U.S. Pat. No. 4,143,600, issued Mar. 13, 1979 of Emil J. Hlinsky filed on the same day as the present application. Reference may be had to that application for a further description (incorporated by reference herein) of the construction of the chain attachment structure 56 beyond that appearing below.

In accordance with an important feature of the present invention, the chain 26 may extend in either of two endwise directions from the winch 24. Consequently, the winch 24 of the present invention is convenient to use because the winch may be located at either end of a load to be secured.

More specifically, the end walls 50 and 52 of the housing 42 are provided respectively with openings 58 and 60 through which the chain 26 can extend. Thus, the chain can take a path from the drum 54 in one direction through the opening 58, or alternatively can take a path in the opposite direction through the opening 60.

When the chain 26 has been connected between a load to be secured and the drum 54, the chain is tightened by rotation of the drum. In order to permit rotation of the drum in a single direction to tighten the chain regardless of which of openings 58 and 60 is utilized, and to provide a direct path for the chain through the housing 42, the openings 58 and 60 are coincident with lines tangent to diametrically opposed points on the drum 54. As illustrated in FIG. 4, the chain extends from the drum 54 through the opening 60, and it will be appreciated that counterclockwise rotation of the drum 54 is effective to wind the chain upon the drum. Alternatively, the chain could extend from the drum through the opening 58 which is tangent to the diametrically opposed part of the drum, and the chain would be tightened by counterclockwise drum rotation. Consequently, a convenient and compact arrangement is provided by locating the openings 58 and 60 in the opposite end walls 50 and 52 at opposite sides of the longitudinal centerline of the housing 42.

In accordance with another feature of the present invention, there is provided a locking mechanism generally designated by the reference numeral 62 for securing the housing 42 of the winch 24 in a selected position along the track 22. The locking mechanism includes a locking bolt 64 carried by the housing end wall 50. In order to accommodate the chain opening 58 in the end wall structure 50, the bolt 64 has a length substantially smaller than the width of the winch 24.

Proceeding now to a more detailed description of the structure of the illustrated embodiment of the invention, the housing 42 with the exception of top wall 48 is formed as a sturdy unitary casting incorporating the bottom wall 46 and the end wall structures 50 and 52. The housing 42 is formed so as to be retained within and slidable along the channel track 22. In the illustrated arrangement, this is accomplished by the provision of four lugs 68, 70, 72 and 74 extending outwardly from the opposite sides of the end wall structures 50 and 52. The lugs are slidably received below the flanges 36 and 38 of the channel track 22 between the side walls 32 and 34.

In order to minimize the size and vertical height of the winch 24 and to accommodate chain 26 within the chamber 44 in a compact manner, each of the chain openings 62 and 64 includes a contiguous portion 76 in the bottom wall 46. The segments 76 extend inwardly from the end of the housing 42 through a substantial portion of the distance from the end of the housing to the drum 54, providing clearance for the chain at the end wall structures 50 and 52 to base 30 of the channel track 22. The housing 42 does not include side walls, and the open sides of the chamber 44 provide clearance for winding of the chain 26 upon the drum 54. As best seen in FIG. 4, the chamber 44 as defined between the end wall structures 50 and 52 is generally circular and concentric with the drum 54 in order to accommodate wrapping of the chain around the drum.

The bottom and top walls 46 and 48 of the housing 42 are provided with circular openings 78 and 80 in which the drum 54 is journalled for rotation. The drum is preferably formed as a unitary part including a central portion 82 of enlarged diameter captured between the walls 46 and 48, and reduced diameter stub portions 84 and 86 received in the openings 78 and 80. In order to guide the chain on the drum, the central portion 82 is encircled by a groove 88.

As indicated above, the chain 26 is releasably attached to the drum 54 by the chain attachment structure 56 described in detail in the above noted copending application of Emil J. Hlinsky. The end link of the chain is inserted into a recess 90 extending inwardly from the periphery of the drum and defined in part by a pair of interfacing walls 92 and 94. Within the recess 90 and extending from the wall 92 is an integral lug 96 sized to be received within the end chain link. Clearance is provided between the end of the lug 96 and the wall 94 to provide a path for entry of the chain link into the recess and over the lug 96. After the chain link is inserted over the lug, a keeper in the form of a pin 98 is inserted into the drum 54 through an opening 100. The pin 98 blocks the path of the chain link, while loads applied by the chain 26 to the drum 54 are carried directly by lug 96 and not by the pin 98.

When the end link of chain 26 has been attached to the drum 54 by means of the chain attachment structure 56, the chain can extend from the housing 42 through either the opening 58 or the opening 60. If the opening 60 is used, the drum may initially be positioned substantially as shown in FIG. 4. If the opening 58 is used, the drum 54 can be initially rotated approximately one hundred eighty degrees from the position shown in FIG. 4. In either case, the chain 26 extends tangentially and in a clockwise sense from the periphery of the drum 54. The drum 54 can then be rotated in a counterclockwise direction in order to take up the chain 26. Rotation of the drum 54 is accomplished by engagement of a key (not shown) in a socket 101 formed in the upper surface of the drum.

Figure 5:
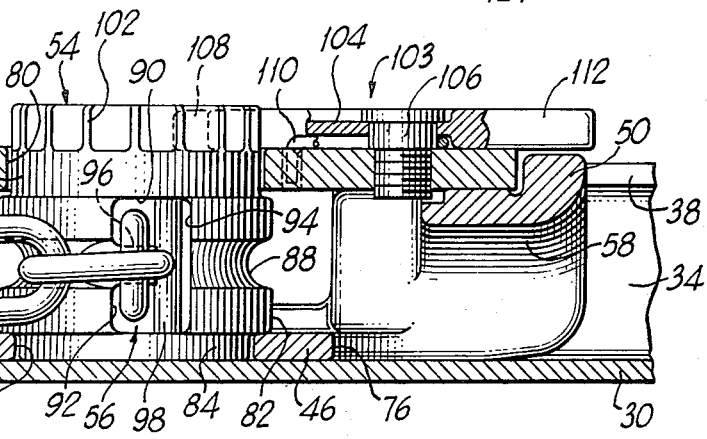
FIG. 5 is a sectional view taken substantially along the line 5—5 of FIG. 4.

To prevent unwinding of the chain 26 after securement of a load, an antireverse mechanism 103 is provided. The uppermost end of the drum 54 comprising an extension of the stub portion 86 is formed as a ratchet gear 102. A pawl lever 104 is pivotally mounted on the cover 48 by means of a pivot screw 106. Lever 104 includes a tooth engaging structure 108 biased toward the ratchet gear 102 by means of a pawl spring 110, a part of which appears in FIG. 5 of the drawings. When the chain has been tightened, the spring 110 biases the structure 108 into engagement with the gear 102 to prevent reverse rotation of the drum 54. To release the pawl for unwinding of the chain, the lever 104 is pivoted by pushing against an extension 112 of the pawl lever 104.

The cover 48 of the housing 42 is movable to provide access to the chamber 44 and to the drum 54 and to permit the release and connection of the chain 26 and drum 54 as well as the feeding of the chain through a selected one of the two opposed chain openings 58 and 60. Since the cover is narrower than the distance between the channel track flanges 36 and 38 (FIG. 1) it is possible to remove the drum 54 and to install and attach the chain 26 while the winch 24 is within the track 22.

In order to permit opening of the cover 48, it is pivotally connected to the remainder of the housing 42 by means of a hinge pin 116 attached by welding to the end of cover 48 and received in a pair of hinge knuckles 118 formed integrally with the end wall structure 52. In order to guide and hold the cover 48 in its closed position, the cover is embraced between a pair of arms 120 extending upwardly from the end wall structure 50 into slots 122 in the cover 48.

The locking mechanism 62 including lock bolt 64 serves the dual functions of selectively locking the housing 42 against sliding movement in the channel track 22 and of selectively locking the cover 48 in its closed position. Moreover, in the illustrated embodiment of the invention, the locking mechanism can assume an intermediate position wherein the cover 48 is locked closed yet the winch 24 can be slidably moved along the track.

More specifically, the lock bolt 64 is reciprocally slidable in a cylindrical recess 124 provided in the end wall structure 50. A convenient and compact arrangement is provided because the recess 124 extends outwardly through the lug 74. In the retracted condition shown in the drawings, the bolt 64 does not interfere with free sliding motion of the winch 24 within the channel track 22. When in its alternate, extended condition, the bolt is received within a selected one of the openings 40 in order securely to lock the winch 24 in place at a selected position along the channel track 22.

Bolt 64 is moved to its retracted position by means of an operating pin 126 slidable in a slot 128 communicating with the recess 124, and is biased outwardly to the locking position by means of a spring 130 held in compression within the recess 124 against the operating pin 126. The slot 128 includes a portion 132 parallel with bolt 64 formed in the cover 48 and a right angle portion 134 extending to the end of the cover 48. In the closed position of the cover, the portion 134 communicates with a slot 136 formed in the outermost wall of the end wall structure 50. In combination, the portions 132, 134 and 136 provide the slot 128 with an L-shape in the nature of a bayonet lock.

Due to the generally L-shape of the slot 120 including portions 132, 134 and 136, the bolt is movable in two directions. From its locked or fully extended position the bolt 64 is moved in the direction of its axis and compresses spring 130 as pin 126 slides along the slot portion 132. When the pin reaches the junction of slot portions 132 and 134, the bolt 64 is then rotated about its axis as pin 126 moves through slot portion 134 and then into slot portion 136. When pin 126 is seated in slot 136 as illustrated in the drawings, the bolt 64 is fully retracted. The force provided by spring 130 is substantially parallel to the bolt axis, and is thus substantially normal to the plane or direction of rotation of the bolt. Consequently, the spring force results in frictional retention of the bolt 64 in the retracted position.

Pin 126 includes an enlarged head portion 138 functioning to retain the cover 48 in its closed position. More specifically, when the bolt 64 is in its locked position and when the operating pin 126 is received in the slot portion 132, the head 138 overlies the cover 48 and prevents it from being raised. Thus, in this position, not only is the winch housing 42 secured against sliding but also the cover 48 is secured against being raised.

When the bolt is retracted and latched in the retracted position, the operating pin is received in the slot portion 136. In this position, the head 138 is clear of the cover. Consequently, in this position the housing is not only slidable along the channel track, but also the cover 48 can be raised for access to the chamber 44 and the drum 54.

In the illustrated embodiment of the present invention, the locking mechanism 62 is also movable to an intermediate position wherein the force of the spring 130 causes the operating pin 126 resiliently to be detained at the junction of the slot portions 134 and 136. In this position, the bolt 64 is retracted so that the housing 42 is slidable in the track 22, while the head 138 overlies the cover 48 to lock the cover 48 in its closed position. A more detailed description of the construction and operation of the locking mechanism 62 may be found in the above referenced copending application of William L. Grube and Allen D. Siblik.

Idler device 28 slidably receiving chain 26 may be used to provide a selected chain angle toward the load and to permit the tiedown winch 24 to be positioned a substantial distance from the load. When idler 28 is used, the chain extends horizontally from the tiedown winch. If desired, the idler device 28 may be omitted and the chain 26 may extend at an angle to horizontal directly to the load. The idler includes a body 142 having lugs 144 slidably received in the channel track 22 and is secured in the track by a spring biased bolt 146 operable by a pin 148 movable in an L-shaped slot 150. Chain 26 extends into the body 142 through an opening in its end (not shown) and exits from the body through a top opening 152.

While the present invention has been described with reference to details of the illustrated embodiment, it should be understood that such details are not intended to limit the scope of the invention as defined in the following claims.

What is claimed and desired to be secured by Letters Patent of the United States is:

1. A vehicle tiedown winch for use in a tiedown system including a track structure having opposed tracks, at least one of which has spaced latching recesses, said tiedown winch comprising:
   a housing;
   a central chamber located between a pair of end portions of the housing;
   top and bottom walls extending between said end portions;
   a winch drum in said chamber mounted for rotation about an axis extending between said top and bottom walls;

a first of said end portions including a first passage extending outwardly from said chamber, said first passage being disposed to one side of the central longitudinal axis of the housing;

a transversely extending cavity in said first end portion disposed on the opposite side of said central longitudinal axis;

said first passage and said cavity both lying in the same horizontal plane;

a locking bolt slidable in said cavity between a retracted position and a locked position wherein said bolt extends transversely from said housing for engaging said latching recesses;

said bolt being substantially shorter than the width of said end wall structure.

2. A tiedown winch as claimed in claim 1, further comprising spring means in said cavity biasing said bolt toward the locked position.

3. A tiedown winch as claimed in claim 2, further comprising a retention pin extending from said bolt and engageable with retaining means on said first end portion for releasably retaining said bolt in the retracted position.

4. A tiedown winch as claimed in claim 1, the second of said end portions including a second passage extending outwardly from said chamber and disposed to said opposite side of said central longitudinal axis.

5. A tiedown winch as claimed in claim 1, the second of said end portions including a second passage extending outwardly from said chamber.

6. A tiedown winch as claimed in claim 1, said first and second end portions of said housing including outwardly extending lugs adapted to be slidably received in the opposed tracks of the track structure.

7. A tiedown winch as claimed in claim 6, wherein said transversely extending cavity extends through one said lug, and wherein said locking bolt is supported in said transversely extending cavity for both sliding and rotational movement.

8. A tiedown winch as claimed in claim 7 further comprising spring means in said cavity biasing said locking bolt toward the locked position, a retention pin extending from said bolt, and retaining means including a generally L-shaped slot in said housing for receiving said retention pin and releasably retaining said bolt in the retracted position.

* * * * *